Nov. 7, 1961  KARL-EVERT A. JOELSON  3,007,454
VIBRATOR
Filed June 29, 1959
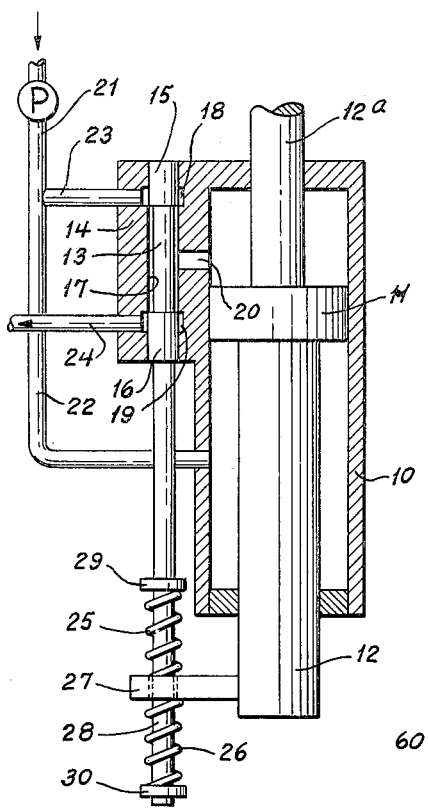
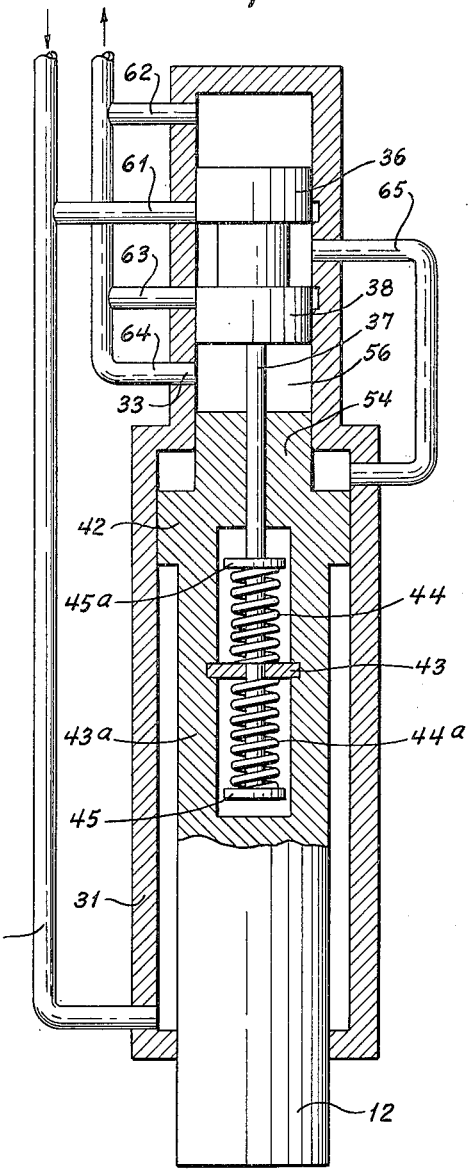
KARL-EVERT ANDERS JOELSON
INVENTOR.
BY *Albert M. Parker*
ATTORNEY.

3,007,454
VIBRATOR
Karl-Evert Anders Joelson, Nykoping, Sweden, assignor to Aktiebolaget Industrikompaniet, Stockholm, Sweden, a corporation of Sweden
Filed June 29, 1959, Ser. No. 823,516
Claims priority, application Sweden July 1, 1958
3 Claims. (Cl. 121—164)

The inventor has already suggested a vibrator comprising a piston with a piston rod and reciprocating in a cylinder, and a valve system movable in a valve casing for supplying pressure liquid from a hydraulic pressure source to the cylinder. In operation, the end of the piston connected to the piston rod is permanently subjected to the pressure of the liquid from this source, and the opposite end of the piston is arranged to be connected to the source of liquid or to an outlet, respectively, according to the position of the valve body. This hydraulic vibrator may be set to work at high frequency, for instance 4000–6000 strokes/min., and with high efficiency and, at the same time the apparatus has small dimensions. The vibrator may with great advantage be utilized for driving rock drills, for example.

When the vibrator is used as a beater, percussion tool or hammer machine the area of the piston subjected by the pressure liquid during the motion of the piston in the working or beating direction is as large as the cross-sectional area of the piston rod. In machines of average size it is, for instance, suitable to construct the piston rod with a cross-sectional area amounting to about 5 cm.$^2$ in order to keep the quantity and pressure of the oil or other liquid within the desired limits. Such a small cross-sectional area would correspond to a diameter of the piston rod amounting to about 25 mm., and for machines constructed for higher pressures and smaller quantities of oil this diameter would be reduced still more which would mean that the piston rod would be too thin and weak to be able to transfer any greater forces.

According to the present invention this disadvantage is avoided by providing the piston, on its side opposite to the force or power transmitting piston rod, with an extension portion in the form of a balancing or auxiliary piston rod or the like, whereby the effective piston area subjected to the pressure liquid on this side of the piston will be reduced correspondingly so that the diameter of the power transmitting piston rod can be increased without departing from the condition indicated above, viz. that the effective piston area for the piston movement in the working direction shall be approximately as large as the cross-sectional area of the power transmitting piston rod. Thus, with this construction the diameter and the cross-sectional area of the piston rod, as well as the piston area, may be increased arbitrarily in a predetermined ratio to one another according to the actual practical requirements. A particular advantage will be gained if the diameter of the balancing or auxiliary piston rod be made as great as or greater than the diameter of the valve body arranged in the vibrator. In this case the valve may be mounted coaxially with the piston and these elements may be inserted into the vibrator casing as one unit.

The invention will now be described in greater detail with reference to two embodiments shown diagrammatically in longitudinal sections on the accompaying drawing.

In FIG. 1, 10 is a cylinder in which a piston 11 is adapted to move axially. The piston is mounted on a working piston rod 12 or the like which passes sealingly through one end wall of the cylinder and which has a cross-sectional area preferably approximately half that of the piston 11. A valve spindle 13 is axially movable in a valve casing 14 which is fitted to or is integral with the cylinder 10. The directions of movement of the piston and the valve spindle are preferably parallel. The valve spindle is fitted with two cams or slide valve heads 15, 16, which fit in a recess 17 in the valve housing and which according to their position relative to said recess open or close the communication between a recess 18 or 19, respectively, and a passage 20 leading to the cylinder above the piston 11. A pipe 21 from a source of hydraulic liquid (a pump) is in permanently open communication with the chamber under the piston 11 through a branch pipe 22 and with the recess 18 through another branch passage 23. An outlet pipe 24 or a return pipe to the pump leads from the recess 19.

The movements of the piston 11 are transmitted to the spindle 13 via either of two springs 25, 26, which are tensioned against each other. In the diagrammatic figure the piston rod 12 has a follower 27 which with a clearance or play is fitted on the portion 28 of the valve spindle projecting outside the valve casing. The springs engage at one end the follower 27 and at the other end the abutments 29, 30, respectively, on the valve spindle; they are preferably pre-tensioned. A movement of the piston 11 in either direction first compresses the corresponding spring and then moves the valve spindle.

On the opposite side of the piston in relation to the side at which the working piston rod 12 is mounted the piston is provided with an extension portion in the form of a balancing or auxiliary piston rod 12a whereby the effective top area of the piston subjected to the hydraulic liquid during the working stroke as shown in the drawing will be reduced and approximately as great as the cross-sectional area of the piston rod 12 for the purpose stated above.

The vibrator operates in the following way:

On the bottom side of the piston 11 there is always acting a force which is equal to the specific pressure of the hydraulic liquid multiplied by the annular piston area outside the piston rod 12. Thus, if the valve spindle 13 is in such a position that the valve head 16 affords an open communication between the upper cylinder chamber and the outlet 24 while the hydraulic liquid supply through the conduit 23 is blocked by the valve head 15, the piston will be subjected to an upward force equal to half the piston area multiplied by the specific hydraulic pressure.

If on the other hand the valve spindle 13 is in an upper position in which the outlet 24 is closed while hydraulic liquid is supplied to the upper piston chamber through the recess 18, the top side of the piston will be subjected to a force which is equal to the effective upper piston area around the auxiliary piston rod 12a multiplied by the specific hydraulic pressure. However, at the same time, there will act on the bottom side of the piston an upward pressure, since said bottom side is permanently actuated by the pressure from the hydraulic source. Thus, in order that the piston 11 shall be in equilibrium the pressure on the upper piston side shall be less than the pressure on the bottom side of the piston. This may be obtained in the neutral position of the valve spindle 13 as shown in FIGURE 1, in which the supply of hydraulic liquid through the conduit 23 and the discharge of liquid through the conduit 24 are both blocked so that the specific hydraulic pressure in the upper part of the cylinder is less than the specific hydraulic pressure in the lower part of the cylinder. The moving elements of the vibrator have the tendency, if they are not disturbed by external forces, to move to this neutral position and even after being actuated by an external force they endeavour to resume said neutral position. They are, however, prevented from remaining in the neutral position because of the resilient coupling between the piston 11 and the valve spindle 13. If the piston has been forced upwards under the action of an external force, as in the figure, the spring 25 is compressed so that the valve spindle 13 is pushed up. This opens the supply of hydraulic liquid through the conduit 23 while the outlet 24 is closed. The pressure on the top side of the piston 11 is greater and the piston is urged down. As a result the spring 26 is compressed again and in turn draws the valve spindle 13 downwards. The hydraulic liquid supply to the upper cylinder chamber is interrupted and instead communication with the outlet 24 is opened. The upwards forces on the piston 11 are prevailing so that the piston moves upwards. The whole operation results in a rapid reciprocating movement of the piston 11 and consequently also of the valve spindle 13. The neutral position will always be passed and the frequency of the movements of the two elements will be very high.

When a new stroke begins the piston 11 will thus move at an accelerating speed and will drive the valve spindle 13 in the same direction but it should be noted that due to the inertia of the valve spindle and the spring coupling with the piston, the valve spindle will lag behind and the spring will be compressed in accordance to the acceleration force of the motion of the valve spindle. When the valve spindle subsequently has passed the neutral position and arrives to the position in which the hydraulic pressure on the piston is reversed the working piston will be stopped and reversed but the valve spindle will continue further until the spring system has reached the neutral position and has been tensioned sufficiently in the other direction to be able to slow down the valve spindle to stop it and then to start its movement in the other direction.

The frequency and amplitude of the vibrator and its piston, respectively, can be adjusted by altering the dimensions of the springs 25 and 26. A control can also be provided within limits by varying the hydraulic pressure and the quantity of hydraulic liquid. The hydraulic pressure can for instance be 50 to 100 kg./cm.$^2$. In one embodiment with 5,000 to 6,000 strokes a minute, the pressure was 70 kg./cm.$^2$; the liquid consumption 120 litres/min.; the stroke energy 6.4 kgm./stroke; the stroke length, 8 mm. and the piston speed, 6.5 metres/sec. The invention is, however, in no way limited to these figures.

The hydraulic liquid may, for example, be oil or water. In rock drilling flushing water is fed to the drilling holes. The driving liquid required for the vibrator approximately corresponds to the amount of flushing water needed. It is therefore possible when drilling at great depths, such as some 100 metres, to drive the vibrator with water from the ground level, thus without any supply of external energy since the energy due to the level of water is sufficient for driving the vibrator. The piston rod 12 can be connected directly with the drill so that they both vibrate together, or the piston rod 12 and its associated elements can transmit their vibratory movement to the drill shank.

The invention can be applied in many other fields such as in excavating and loading machines; the vibrator then being coupled with the excavating elements to facilitate their digging into the material to be loaded. Further examples on applications in which the vibrator can be used with advantage are: releasing material in funnels and bins by shaking, conveying material in feed channels and dewatering of various materials (for example, thickening pulp).

If the machine is used as a beating (hammering) machine the coupling between the piston rod and the tool is adjusted so that the impact occurs before the piston motion meets the counter pressure from the liquid. This brakes the working piston so that the valve spindle catches up and reverses the direction of motion.

If a pressure reduction valve or similar device is used so that the hydraulic pressure on the piston rod side 12 of the piston for instance is lower than the hydraulic pressure in the conduit 23, the hydraulic forces acting on the two sides of the piston can nevertheless be made equal by a corresponding choice of the ratio between the outer diameters of the piston and piston rod.

In FIG. 2, 42 is the working piston which is movable in a cylinder 31 and has a piston rod 12 affixed to it. A hollow portion 43a of the piston rod contains the springs 44, 44a required for transferring the motion to the slide valve heads 36, 38, said springs being tensioned on both sides of an abutment 43 in the piston and an abutment 45, 45a, respectively, on the valve spindle 37. The valve body 36, 38 is arranged coaxially with the piston and has the same diameter as the auxiliary piston rod 54 mounted on the opposite side of the piston in relation to the part 43a. The extension of the part 43a forms the power transmitting piston rod 12. The supply pipe of hydraulic liquid to the working cylinder 31 on one side of the piston 42 is shown at 60.

In the neutral or central position shown in FIG. 2 the valve body 36 closes the inlet 61 and the valve body 38 has just closed the outlet 63. If in starting the machine the parts are in this position they must be actuated by an external impulse to be displaced from said position, for instance by the piston rod 12 of the working piston being displaced upwards, whereby the piston rod will move the valve bodies 36, 38 upwards through the intermediary of the springs 44, 44a and the valve spindle 37. Now, the inlet 61 is opened by valve body 36 and the hydraulic fluid is supplied through passage 65 to the upper side of the working piston 42 the effective area of which is greater than the effective area of the lower piston side permanently exposed to the hydraulic pressure from the conduit 60. The consequence is that the working piston will move downwards carrying with it the valve system 36, 38, yet with a certain lag due to the resiliency of the springs 44, 44a. When the valve body 36 closes the inlet 61 again during the downward motion the supply of hydraulic pressure to the upper side of the working piston stops. After a short moment of time the valve body 38 opens the outlet 63 so that the pressure on the upper side of the piston will be released and the piston 42 reverses its direction of movement. The operation is now repeated and in this manner a rapid reciprocating (vibratory) motion will be imparted to the working piston with piston rod 12. In continuous operation the working piston and the valve system will move as two freely oscillating masses to a certain extent which are intercoupled by means of the spring system 44, 44a in which the springs permanently are urged against the intermediary abutment 43. The springs 44, 44a are compressed alternatingly according as the piston moves in one direction or the other, and the spring system 44, 44a serving as motion transmitting element will cause that in continuous operation the valve system even will move in opposite direction to but synchronously with piston 42.

The auxiliary piston rod 54 of FIG. 2 has the same function as the auxiliary piston rod 12a of FIG. 1, and the upper effective area of the piston 42 is approximately as great as the cross-sectional area of the piston rod 43a 12, due to the provision of the auxiliary piston rod 54. In other respects the arrangement functions in substantially the same manner as according to FIG. 1.

The outlets 62 and 64 may also communicate with the atmosphere. Moreover, the springs 25, 26 and 44, 44a, respectively, may be replaced by one single spring inserted in the connection between the valve system and the piston, said spring during the motion of the piston in one direction and the other alternatingly functioning as a compression spring and pulling spring respectively.

What I claim is:

1. A vibrator arrangement comprising in combination a working cylinder, a piston reciprocable in said cylinder and a power transmitting piston rod fixed on one side of said piston, means for continuously subjecting the effective piston area remaining on said piston around said piston rod to constant pressure from a constant pressure fluid source, a valve casing fixed on said cylinder, and an oscillating valve body influenced by the reciprocating movement of the piston by the intermediary of resilient means mounted in and for reciprocation in said casing for alternately connecting the portion of said cylinder on the side of said piston opposite to said piston rod with fluid under pressure from said pressure fluid source and with fluid at an outlet pressure lower than the pressure of said source respectively so as to cause reciprocating movement of the piston owing to the relationship of the effective piston areas subjected to pressure on the opposite sides of said piston with a stroke length dependent upon the dimensioning of said resilient means, and a rod-like extension having a smaller diameter than that of said piston rod fixed on the side of said piston opposite to said piston rod, said rod-like extension extending through the wall of the cylinder and confining an effective piston area between itself and the cylinder wall greater than the effective piston area on the piston rod side so as to allow displacement of said piston against the action of said constant pressure.

2. A vibrator arrangement as in claim 1 wherein the effective piston area subjected to said lower outlet pressure on the side opposite to the piston rod is approximate as great as the cross sectional area of said power transmitting piston rod.

3. A vibrator arrangement as in claim 1, wherein the diameter of said piston-rod-like extension is approximately at least as great as the diameter of said valve body for enabling mounting of said valve body and said piston in one unit coaxially with one another, said rod like extension being located between said piston and said valve body and separating the working space of said working cylinder from the inner space of said valve casing.

References Cited in the file of this patent
UNITED STATES PATENTS

| | | |
|---|---|---|
| 1,264,318 | McGrath | Apr. 30, 1918 |
| 2,406,747 | Davis | Sept. 3, 1946 |
| 2,532,663 | Ellis | Dec. 5, 1950 |
| 2,610,613 | Bryant | Sept. 16, 1952 |